(12) United States Patent
Chai

(10) Patent No.: US 10,454,696 B2
(45) Date of Patent: Oct. 22, 2019

(54) MULTICAST DISTRIBUTION TREE SWITCHING

(71) Applicant: HEWLETT PACKARD ENTERPRISE DEVELOPMENT LP, Houston, TX (US)

(72) Inventor: Jialin Chai, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/507,439

(22) PCT Filed: Aug. 27, 2015

(86) PCT No.: PCT/CN2015/088209
§ 371 (c)(1),
(2) Date: Feb. 28, 2017

(87) PCT Pub. No.: WO2016/029857
PCT Pub. Date: Mar. 3, 2016

(65) Prior Publication Data
US 2017/0288890 A1 Oct. 5, 2017

(30) Foreign Application Priority Data
Aug. 28, 2014 (CN) .......................... 2014 1 0431346

(51) Int. Cl.
*H04L 12/18* (2006.01)
*H04L 12/46* (2006.01)
(Continued)

(52) U.S. Cl.
CPC .......... *H04L 12/1854* (2013.01); *H04L 12/18* (2013.01); *H04L 12/46* (2013.01);
(Continued)

(58) Field of Classification Search
CPC ......... H04L 12/00; H04L 12/18; H04L 12/46; H04L 12/1854; H04L 12/4625;
(Continued)

(56) References Cited

U.S. PATENT DOCUMENTS

2012/0057594 A1 3/2012 Boers et al.

FOREIGN PATENT DOCUMENTS

CN 101364888 B 2/2009
CN 101645790 B 2/2010
(Continued)

OTHER PUBLICATIONS

CN102299848A eSpacenet machine translation.*
(Continued)

*Primary Examiner* — Michael Thier
*Assistant Examiner* — Nevena Zecevic Sandhu

(57) ABSTRACT

A mapping relationship between a private network multicast group address, which may be preset to support switching from a default Multicast Distribution Tree (MDT) to a data MDT, and a data group address may be stored in a first Provider Edge ("PE") device. If a private network multi cast data flow corresponding to the mapping relationship satisfies a condition of switching from the default MDT to the data MDT, the first PE device may send a data MDT switch initiation packet including the private network multicast group address and the data group address to a second PE device on the default MDI, so that the second PE device joins the data MDT, a root of which is the first PE device, using the data group address. The first PE device may switch the private network multicast data flow to the data MDT, so that the private network multicast data flow is transmitted on the data MDT.

20 Claims, 5 Drawing Sheets

(51) Int. Cl.
 H04L 12/54 (2013.01)
 H04L 12/751 (2013.01)
 H04L 12/761 (2013.01)
 H04L 12/723 (2013.01)

(52) U.S. Cl.
 CPC .......... *H04L 12/4625* (2013.01); *H04L 12/56* (2013.01); *H04L 45/02* (2013.01); *H04L 45/16* (2013.01); *H04L 45/50* (2013.01)

(58) Field of Classification Search
 CPC ......... H04L 12/56; H04L 45/00; H04L 45/02; H04L 45/16; H04L 45/50
 See application file for complete search history.

(56) References Cited

FOREIGN PATENT DOCUMENTS

| CN | 102137000 B |   | 7/2011  |           |
|----|-------------|---|---------|-----------|
| CN | 102299848 A | * | 12/2011 | H04L 12/761 |
| CN | 103491015   |   | 1/2014  |           |
| CN | 103685040   |   | 3/2014  |           |
| EP | 1737164     |   | 12/2006 |           |

OTHER PUBLICATIONS

CN103491015A Google machine translation.*
CN103491015A ProQuest machine translation.*
CN103685040A Google machine translation.*
International Search Report and Written Opinion dated Nov. 30, 2015, PCT Patent Application No. PCT/CN2015/088209 dated Aug. 27, 2015, 7 pages.
Rosen et al., "Cisco Systems' Solution for Multicast in BGP/MPLS IP VPNs", Independent Submission, Request for Comments: 6037, Oct. 2010, 25 pages.
International Preliminary Report on Patentability received for PCT Patent Application No. PCT/CN2015/088209, dated Mar. 9, 2017, 6 pages.

* cited by examiner

```
 0           1           2           3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| 1 Type  |    Length     |   Reserved    |
+-+-+-+-+-+-+-+-+-+-+-+-+-+-+-+-+-+-+-+-+-+-+-+-+-+-+-+-+-+-+-+-+
|          C-group                        |
+-+-+-+-+-+-+-+-+-+-+-+-+-+-+-+-+-+-+-+-+-+-+-+-+-+-+-+-+-+-+-+-+
|          P-group                        |
+-+-+-+-+-+-+-+-+-+-+-+-+-+-+-+-+-+-+-+-+-+-+-+-+-+-+-+-+-+-+-+-+
```

Fig. 6

MULTICAST DISTRIBUTION TREE SWITCHING

This application claims the benefit of priority from Chinese Patent Application, No. 201410431346.7, entitled "Multicast distribution tree switching method and device" and filed on Aug. 28, 2014, the entire content of which is hereby incorporated by reference.

BACKGROUND

In a multicast Virtual Private Network (VPN), multicast transmission technologies are implemented based on a Multi-protocol Label Switching (MPLS) Layer-3 Virtual Private Network (L3VPN). The L3VPN is the VPN implemented using the Border Gateway Protocol (BGP) and MPLS extension technology and is constituted by a backbone network of an operator and sites. The sites are isolated and interconnect with each other via the backbone network. The VPN may be taken as a group of strategies, which are used to control connection among the sites.

BRIEF DESCRIPTION OF THE DRAWINGS

FIG. 6 is an exemplary format for an MDT join TLV in accordance with various examples in the present disclosure.

DETAILED DESCRIPTION

Figure 1:
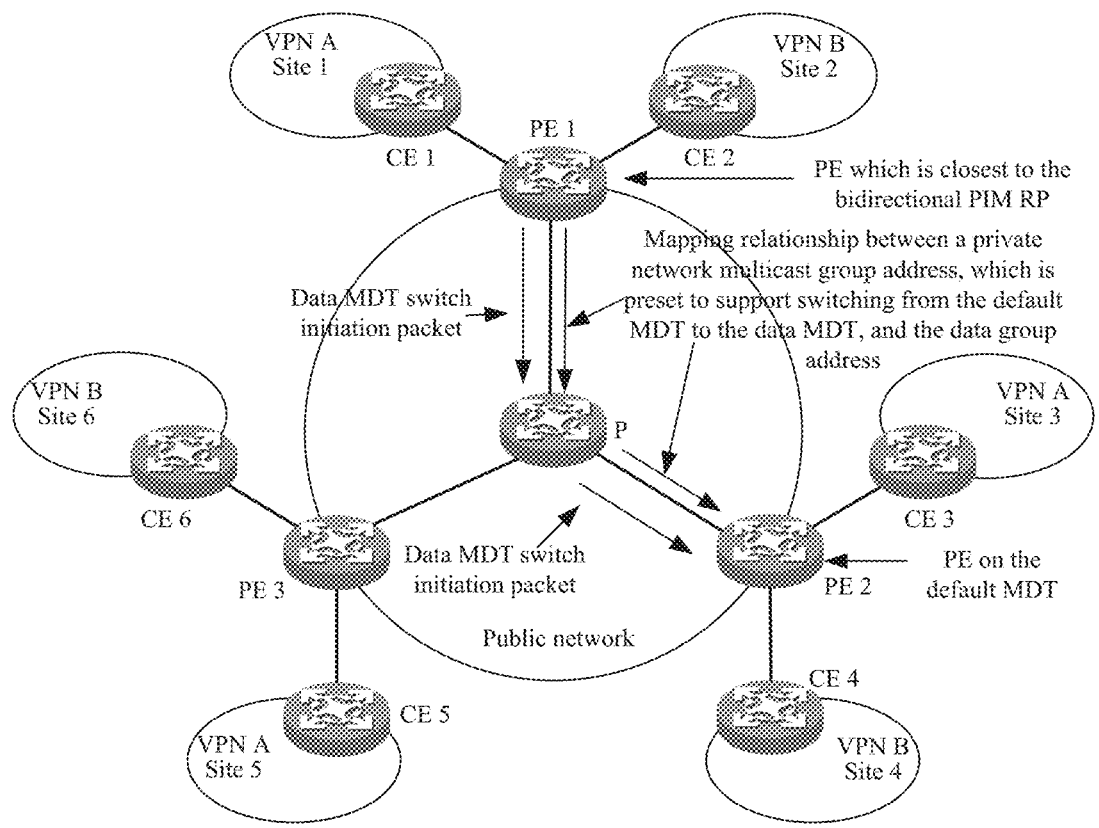
FIG. 1 is a diagram illustrating structure of a VPN.

FIG. 1 is a diagram illustrating structure of a virtual private network (VPN). The example network shown in FIG. 1 includes three kinds of devices.

The first kind of device is a Customer Edge (CE) device. The CE device is an edge device that connects a customer site to the public network. For example, it may be a router, switch or a host. The CE device may be used to release network routing. The customer site may, for example, be a branch site or a main site of an enterprise.

The second kind of device is a provider device P. The provider device P may be a central device of a public network and is directly connected with the CE devices.

The third kind of device is a PE device. The PE device may be an edge device of the public network and directly connect with a CE device. The PE device may be used to process VPN routing.

The VPN may consist of sites. A VPN may correspond to a default group. A default Multicast Distribution Tree (MDT) may be created in the public network with a multicast group address (or default group address for short) corresponding to the default group. Private network multicast data flow in a VPN instance may be forwarded via the default MDT.

Each VPN instance may correspond to a data group. Each data group may correspond to a multicast group address (or data group address for short). All PEs in the VPN instance may store a mapping relationship between a private network [S, G] address pair and the data group address. S may represent a source address and G may represent a multicast group address. The mapping relationship between the private network [S, G] address pair and the data group address may be created based on a (S. G) forwarding table. That is, the private network [S, G] address pair of data flow, which may need to be switched to the data MDT, may be found from the (S, G) forwarding table and the private network [S, G] address pair may be made to correspond to a data group address to create the mapping relationship between the private network [S, G] address pair and the data group address. That is, the mapping relationship between the private network [S, G] address pair and the data group address can be created for the data flow, which may be forwarded according to the (S, G) forwarding table. After the mapping relationship is created, the data flow may be switched to the data MDT according to the mapping relationship.

For instance, the Site 1, Site 3 and Site 5 in FIG. 1 may belong to VPN A. The PE1, PE2 and PE3 may store the mapping relationship between the private network [S, G] address pair and the data group address. For instance, if the PE1 makes a determination that private network multicast data flow in the VPN A satisfies a condition of the switching from the default MDT to the data MDT, the PE1 may obtain the private network [S, G] address pair of the private network multicast data flow, find the data group address corresponding to the private network [S, G] address pair using the mapping relationship, create the data MDT using the data group address and transmit the private network multicast data flow using the data MDT.

As for the private network using bidirectional Protocol Independent Multicast (PIM) protocol, the bidirectional PIM may not maintain data source information. That is, a private network bidirectional PIM forwarding table, i.e. (*, G) forwarding table may not include a source address S. When the PE1 receives the private network multicast data flow from the private network using the bidirectional PIM protocol and the private network multicast data flow satisfies the condition of switching from the default MDT to the data MDT, since the mapping relationship between the private network [S, G] address pair and the data group address is created for the data flow, which is forwarded using the (S, G) forwarding table, no mapping relationship between the private network [S, G] address pair and the data group address may be set for the data flow, which may be forwarded using the (*, G) forwarding table. Therefore, the data group address corresponding to the private network [S, G] address pair of the private network data flow may not be able to be found according to the mapping. relationship between the private network [S, G] address pair and the data group address stored in PE1. Thus, the data MDT cannot be created to transmit the private network multicast data flow, i.e. the switching from the default MDT to the data MDT cannot be finished.

Figure 2A:
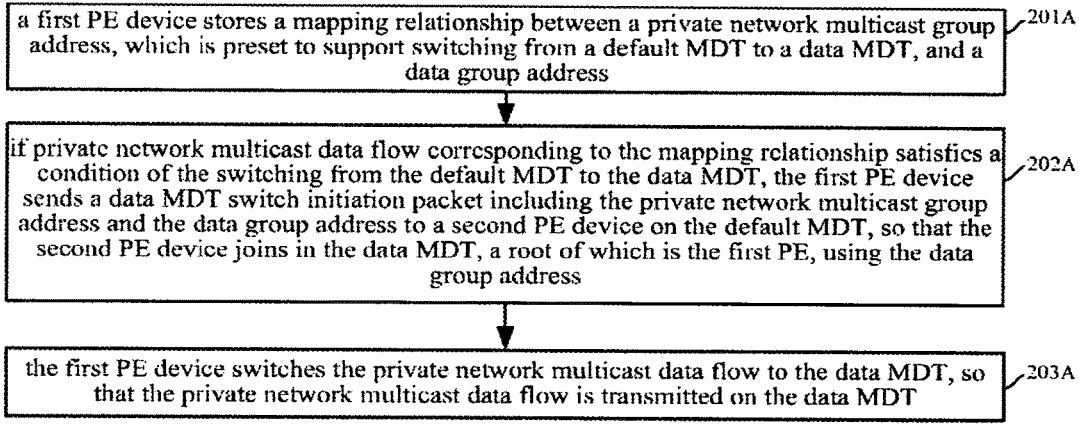
FIG. 2A is a flow chart illustrating a Multicast Distribution Tree (MDT) switching method in accordance with various examples of the present disclosure.

FIG. 2A is a flow chart illustrating a Multicast Distribution Tree (MDT) switching method in accordance with various examples of the present disclosure. The MDT switching method may include following blocks.

At block 201A, a first PE device may store a mapping relationship between a private network multicast group address, which may be preset to support switching from a default MDT to a data MDT, and a data group address.

At block 202A, if private network multicast data flow corresponding to the mapping relationship satisfies a condition of the switching from the default MDT to the data MDT, the first PE device may send a data MDT switch initiation packet including the private network multicast group address and the data group address to a second PE device on the default MDT, so that the second PE device may join in the data MDT, a root of which may be the first PE, using the data group address.

At block 203A, the first PE device may switch the private network multicast data flow to the data MDT, so that the private network multicast data flow may be transmitted on the data MDT.

Figure 2B:
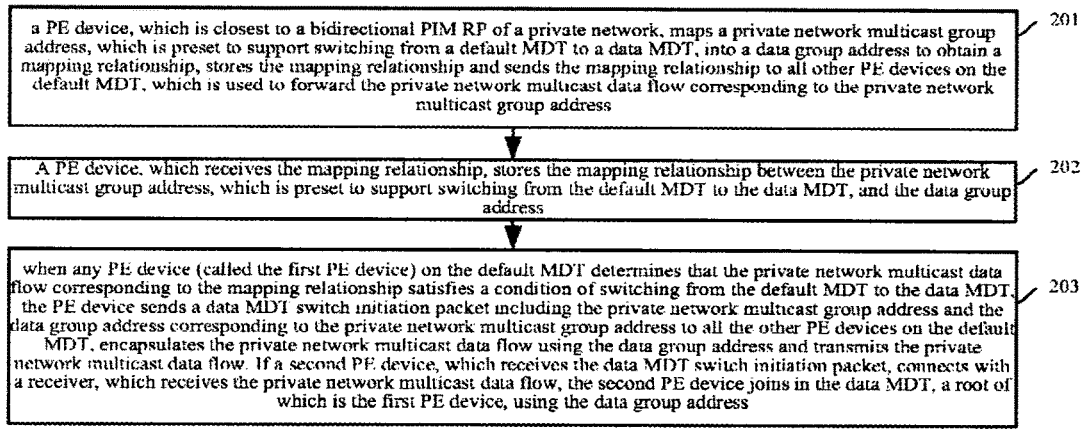
FIG. 2B is a flow chart of another MDT switching method in accordance with various examples of the present disclosure.

FIG. 2B is a flow chart of another MDT switching method in accordance with various examples of the present disclosure. FIG. 2B may include following blocks.

At block 201, a PE device (or Rendezvous Port (RP) PE for short), which may be closest to a bidirectional PIM RP of a private network, may map a private network multicast group address, which may be preset to support switching from a default MDT to a data MDT, into a data group address to obtain a mapping relationship, store the mapping relationship and send the mapping relationship to all other PE devices on the default MDT, which may be used to forward the private network multicast data flow corresponding to the private network multicast group address.

In an example of the present disclosure, the RP PE may send the mapping relationship to a next-hop PE device of the RP PE on the default MDT or send the mapping relationship to a P device on the default MDT. The P device may send the mapping relationship to the other PE devices on the default MDT, so that all the PE devices on the default MDT may store the mapping relationship.

The RP PE device may store a private network bidirectional PIM forwarding table, i.e. a (*, G) forwarding table. If the private network multicast group address in the private network bidirectional PIM forwarding table is a private network multicast group address, which is preset to support the switching from the default MDT to the data MDT, the RP PE may select a data group address, which may be least cited, from a group of data group addresses corresponding to a VPN instance, to which the private network multicast group address may belong, send a mapping relationship between the private network multicast group address and the data group address, which may be least cited, to all the other PE devices on the default MDT.

In an example of the present disclosure, the data group address, which may be least cited, may be the data group address, which may be least used.

At block 202, PE devices, which may receive the mapping relationship, may store the mapping relationship between the private network multicast group address, which may be preset to support switching from the default MDT to the data MDT, and the data group address.

At block 203, when any PE device (called the first PE device) on the default MDT determines that the private network multicast data flow corresponding to the mapping relationship satisfies a condition of switching from the default MDT to the data MDT, the first PE device may send a data MDT switch initiation packet including the private network multicast group address and the data group address corresponding to the private network multicast group address to all the other PE devices on the default MDT, encapsulate the private network multicast data flow using the data group address and transmit the private network multicast data flow. If a second PE device, which receives the data MDT switch initiation packet, connects with a receiver, which may receive the private network multicast data flow, the second PE device may join in the data MDT, a root of which may be the first PE device, using the data group address.

In an example of the present disclosure, the first PE device may periodically check the stored mapping relationship between the private network multicast group address, which may be preset to support switching from the default MDT to the data MDT, and the data group address, and make a determination as to whether there may be private network multicast data flow corresponding to the mapping relationship, which may satisfy the condition of switching from the default MDT to the data MDT.

The condition of switching from the default MDT to the data MDT may be that a flow forwarding rate of the private network multicast data flow may keep larger than a threshold in a first time period.

In an example of the present disclosure, the second PE device may receive the data MDT switch initiation packet sent from the first PE device, make a determination as to whether the second PE device connects with the receiver, which may receive the private network multicast data flow. If the second PE device connects with the receiver, the second PE device may join in the data MDT, the root of which may be the first PE device, using the data group address. If the second PE device does not connect with the receiver, the second PE device may cache the private network multicast group address and the data group address corresponding to the private network multicast group address. After the second PE device connects with the receiver, the second PE device may join in the data MDT, the root of which may be the first PE device, using the data group address.

In an example of the present disclosure, when the first PE device receives a first data MDT switch initiation packet from another PE device, the first PE device may read a first private network multicast group address, which may be preset to support switching from a first default MDT to a first data MDT, and a first data group address from the first data MDT switch initiation packet. The first PE device may check whether the first PE device connects with a receiver, which may receive the private network multicast data flow corresponding to the first private network multicast group address. If the first PE device connects with the receiver, the first PE device may join in the first data MDT, the root of which may be the PE device initiating the first data MDT switch initiation packet, using the first data group address. If the first PE device does not connect with the receiver, the first PE device may cache the first private network multicast group address and the first data group address corresponding to the first private network multicast group address. After the first PE device connects with the receiver, the first PE device may join in the first data MDT, the root of which may be the PE device initiating the first data MDT switch initiation packet, using the first data group address.

In an example of the present disclosure, in a second time period after the first PE device initiates the data MDT switch initiation packet, the first PE device may stop using a default group address corresponding to the private network multicast group address and encapsulate the private network multicast data flow corresponding to the private network multicast group address using the data group address.

At block 201, the method for the RP PE device to send the mapping relationship to all the other PE devices on the default MDT may include: sending the mapping relationship between the private network multicast group address and the data group address to all the other PE devices on the default MDT using a type-length-value ("TLV") of an MDT join packet. A type field of the TLV of the MDT join packet may include a bidirectional PIM-specific data MDT switch notice packet identifier.

At block 203, the method for the first PE device to send the data MDT switch initiation packet to all the other PE devices on the default MDT may include that the first PE device may send the private network multicast group address and the data group address corresponding to the private network multicast group address to all the other PE devices on the default MDT corresponding to the private network multicast group address using a TLV of an MDT join packet. A type field of the TLV of the MDT join packet may include a bidirectional PIM-specific data MDT switch initiation packet identifier.

In an example of the present disclosure, when the first PE device finds that any private network multicast group address using the data MDT satisfies a condition of switching from the data MDT to the default MDT, the first PE device may stop using the data group address corresponding to the private network multicast group address and encapsulate the private network multicast data flow with the default group address corresponding to the private network multicast group address.

The condition of switching from the data MDT to the default MDT may include:

1) The flow forwarding rate of the private network multicast data flow corresponding to the private network multicast group address may keep less than a threshold in a third time period;

2) The scope of the data group addresses may be changed, resulting in that the used data group address is not in the changed scope of the data group addresses; and 3) The private network multicast group address, which may be preset to support switching from the default MDT to the data MDT may be changed and the private network multicast group address, which may have been switched to the data MDT, may not support the switching from the default MDT to the data MDT.

Figure 3:
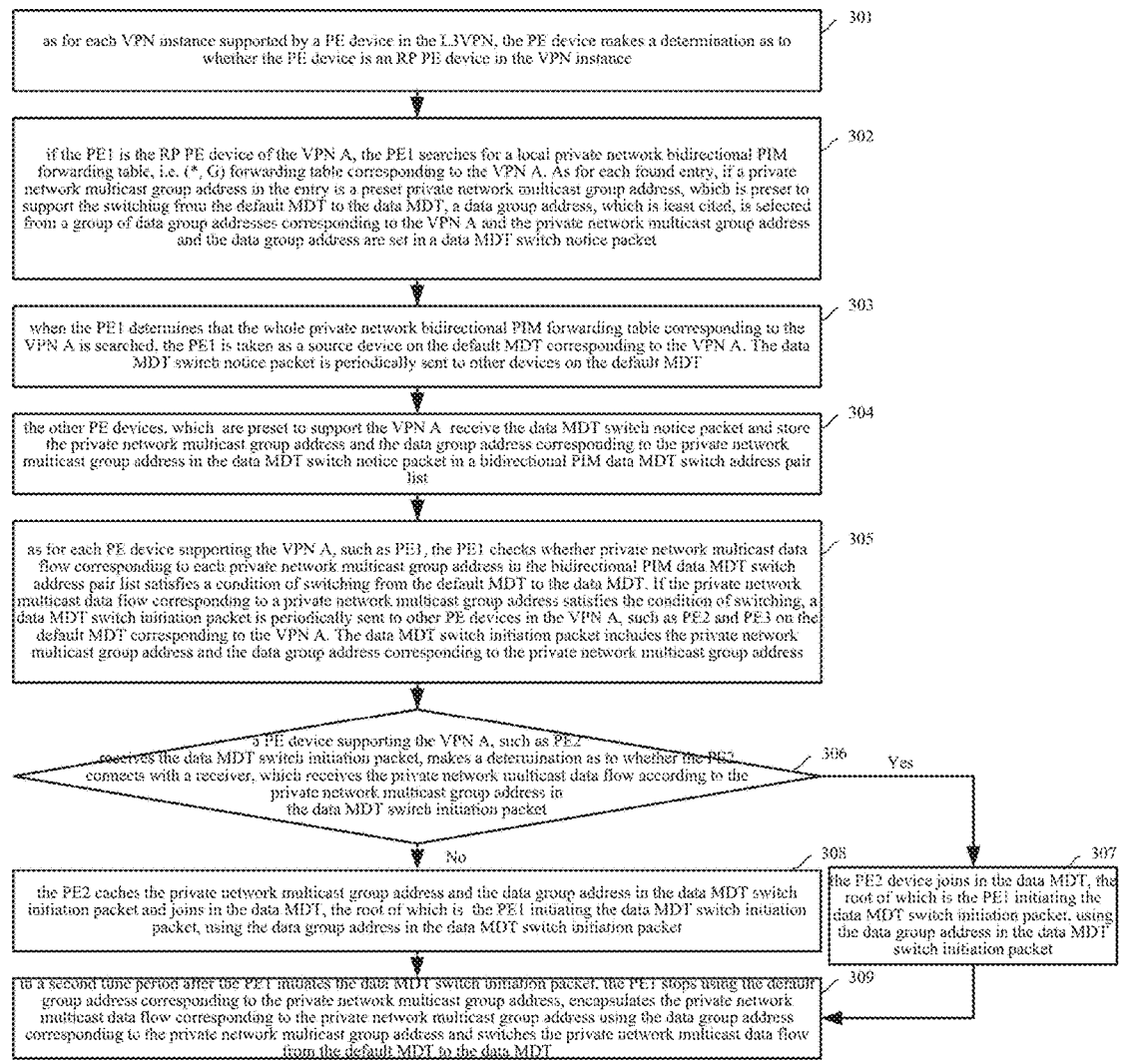
FIG. 3 is a flow chart of another MDT switching method in accordance with various examples of the present disclosure.

FIG. 3 is a flow chart of another MDT switching method in accordance with various examples of the present disclosure. In the VPN, each VPN may correspond to a default group. Each default MDT may be a distribution tree, which may be created using a multicast group address allocated to the default group. That is, each VPN may correspond to a default MDT. All PE devices in the VPN are PE devices on the default MDT. Taking the VPN A in FIG. 1 for example, the PE1, PE2 and PE3 in the VPN A may be PE devices on the default MDT.

The MDT switching method may include following blocks.

At block 301, as for each VPN instance supported by a PE device in the L3VPN, the PE device may make a determination as to whether the PE device is an RP PE device in the VPN instance.

At this block, the RP PE device in the VPN instance may be a PE device in the VPN instance, which may be closest to a site of a bidirectional PIM RP.

For instance, the PE1 in FIG. 1 may be the PE device, which may be closest to the site of the bidirectional PIM RP. That is, the PE1 may be the RP PE device.

At block 302, if the PE1 is the RP PE device of the VPN A, the PE1 may search for a local private network bidirectional PIM forwarding table, i.e. (*, G) forwarding table corresponding to the VPN A. As for each found entry, if a private network multicast group address in the entry is a private network multicast group address, which is preset to support the switching from the default MDT to the data MDT, a data group address, which may be least cited, may be selected from a group of data group addresses corresponding to the VPN A and the private network multicast group address and the data group address may be set in a data MDT switch notice packet.

At block 303, when the PE1 determines that the whole private network bidirectional PIM forwarding table corresponding to the VPN A is searched, the PE1 may be taken as a source device on the default MDT corresponding to the VPN A. The data MDT switch notice packet may be periodically sent to other devices on the default MDT.

At block 304, the other PE devices, which may be preset to support the VPN A, such as PE2 and PE3 may receive the data MDT switch notice packet and store the private network multicast group address and the data group address corresponding to the private network multicast group address in the data MDT switch notice packet in a bidirectional PIM data MDT switch address pair list.

At block 305, as for each PE device, which may be preset to support the VPN A, such as PE1, the PE1 may check whether private network multicast data flow corresponding to each private network multicast group address in the bidirectional PIM data MDT switch address pair list satisfies a condition of switching from the default MDT to the data MDT. If the private network multicast data flow corresponding to a private network multicast group address satisfies the condition of switching, a data MDT switch initiation packet may be periodically sent to other PE devices in the VPN A, such as PE2 and PE3 on the default MDT corresponding to the VPN A. The data MDT switch initiation packet may include the private network multicast group address corresponding to the private network multicast data flow satisfying the condition of switching and the data group address corresponding to the private network multicast group address.

At block 306, a PE device, which may be preset to support the VPN A, such as PE2 may receive the data MDT switch initiation packet, make a determination as to whether the PE2 connects with a receiver, which may receive the private network multicast data flow according to the private network multicast group address in the data MDT switch initiation packet. If the PE2 connects with a receiver, block 307 may be executed. If the PE2 does not connect with a receiver, block 308 may be executed.

At block 307, the PE2 device may join in the data MDT, the root of which may be the PE1 initiating the data MDT switch initiation packet, using the data group address in the data MDT switch initiation packet. Block 309 may be executed.

At block 308, the PE2 may cache the private network multicast group address and the data group address in the data MDT switch initiation packet and join in the data MDT after the PE2 connects with the receiver, the root of which may be the PE1 initiating the data MDT switch initiation packet, using the data group address in the data MDT switch initiation packet. Block 309 may be executed.

At block 309, in a second time period after the PE1 initiates the data MDT switch initiation packet, the PE1 may stop using the default group address corresponding to the private network multicast group address, encapsulate the private network multicast data flow corresponding to the private network multicast group address using the data group address corresponding to the private network multicast group address and switch the private network multicast data flow from the default MDT to the data MDT.

The above block 301 may be implemented as follows.

Taking the PE1 for example, as for each VPN instance supported by the PE1, the PE1 may execute following operations.

The PE1 and a local CE device may learn routing to the opposite part with a non-Exterior Gateway Protocol (EGP) mode. The PE1 and another PE device may learn routing to the other part via an EGP mode without considering cross-domain networking and dual homing networking.

As for each VPN instance supported by the PE1, the PE1 may learn a bidirectional PIM RP address in the VPN.

The PE1 may make a determination as to whether an RP address is the address of the PE1. If the RP address is the address of the PE1, this method may end.

If the RP address is not the address of the PE1, the PE1 may perform multicast Reverse Path Forwarding (RPF) checking for the RP address. If routing type of the RP address is the EGP, the PE1 may not be the RP PE device. If the routing type of the RP address is not the EGP, the PE1 may be the RP PE device.

The routing types used by the multicast module may include:

1, Interior Gateway Protocol (IGP) routing, which may be unicast routing;

2, EGP routing, which may be the unicast routing;

3, unicast (or direct) routing;

4, other types of unicast routing, such as unicast static routing, etc. and 5, multicast static routing.

The IGP routing may represent the routing informing the multicast module via a unicast routing protocol, such as Open Shortest Path First (OSPF), Routing Information Protocol (RIP) and Intermediate System to Intermediate System (ISIS).

The EGP routing may represent the routing informing the multicast module via a Borger Gateway Protocol (BGP) unicast routing protocol.

The PE1 and the CE device may learn routing to the opposite part via the non-EGP mode. The PE1 and another PE device may learn the routing to the opposite part via the EGP mode. The PE1 may perform the multicast RPF checking for the address of the RP. If routing type of the RP address is the EGP, a determination that the RP may not be in the local VPN and may be in a remote VPN may be made. Therefore, a determination that the PE1 may not be RP PE device may be made.

At the above block 302, as for the VPN A, an administrator may configure a group of data group addresses corresponding to the VPN A on all PE devices, which may be preset to support the VPN A and configure private network multicast group addresses, which may be preset to support the switching from the default MDT to the data MDT in the VPN A.

With this block, as for the VPN A supported by the PE1, the PE1 may send out a data MDT switch notice packet. The data MDT switch notice packet may include an address pair, i.e. the private network multicast group address and the data group address. The private network multicast group address in each address pair may be same as a private network multicast group address, which may be set on the PE1 and may be preset to support switching from the default MDT to the data MDT.

FIG. 6 is an exemplary format for an MDT join TLV in accordance with various examples in the present disclosure. An example of the present disclosure may define a bidirectional PIM-specific MDT join TLV. The MDT join TLV may be dedicated to include the address pair, i.e. the private network multicast group address, which may be preset to support the switching from the default MDT to the data MDT, and the data group address. When the public network adopts the IPv4, the format of the MDT join TLV may be as depicted in FIG. 6.

The MDT join TLV may include a bidirectional PIM-specific data MDT switch notice packet identifier. A bit in the Type field, which may not be occupied, may be used to identify whether the packet is the bidirectional PIM-specific data MDT switch notice packet. For instance, the fourth bit in the first byte of the Type filed may be used to identify whether the packet is the bidirectional PIM-specific data MDT switch notice packet. If the bit is set as 1, the bit may be used to identify that the packet is the bidirectional PIM-specific data MDT switch notice packet. If the value of the Type field is 17, it may be identified that the packet may be an IPv4 bidirectional PIM-specific data MDT switch notice packet. The value of the Length field may be 12. The C-group field may include each private network multicast group address. The P-group field may include the data group address corresponding to the each private network multicast group address.

When the public network adopts IPv6, the structure of the MDT join TLV may be the same as the structure of the MDT switch TLV when the public network adopts the IPv4. Partial fields of the MDT join TLV may be different from those of the MDT switch TLV At block 305, as for the VPN A, the administrator may configure a condition of switching from the default MDT to the data MDT for all PE devices, which may be preset to support the VPN A. The condition may be that traffic forwarding rate of the private network multicast data flow corresponding to the private network multicast group address may exceed a threshold in a first time period. As for the same private network multicast group address, different thresholds may be configured for different PE devices according to processing ability of the different PE devices.

The data MDT switch initiation packet at this block may adopt the MDT join TLV at block 302. The MDT join TLV may include the bidirectional PIM-specific data MDT switch initiation packet identifier. A bit in the Type field, which may not be occupied, may be used to identify whether the packet is the bidirectional PIM-specific data MDT switch initiation packet. For instance, the third bit in the first byte of the Type filed may be used to identify whether the packet is the bidirectional PIM-specific data MDT switch initiation packet. If the bit is set as 1, the bit may be used to identify that the packet is the bidirectional PIM-specific data MDT switch initiation packet. If the value of the Type field is 33, it may be identified that the packet may be an IPv4 bidirectional PIM-specific data MDT switch initiation packet. The value of the Length field may be 12. The C-group field may include each private network multicast group address satisfying the condition of switching. The P-group field may include the data group address corresponding to the private network multicast group address.

If the RP PE device of the VPN A is the sender of the bidirectional PIM-specific MDT switch initiation packet, the RP PE device may need to transmit the bidirectional PIM-specific MDT switch notice packet and bidirectional PIM-specific MDT switch initiation packet. The bidirectional PIM-specific MDT switch notice packet and bidirectional PIM-specific MDT switch initiation packet may be respectively transmitted or combined into a same packet and transmitted. If the bidirectional PIM-specific MDT switch notice packet and bidirectional PIM-specific MDT switch initiation packet are combined, the bidirectional PIM-specific MDT switch notice packet identifier and bidirectional PIM-specific MDT switch initiation packet identifier may be carried in the Type field of the MDT join TLV. For instance, when the public network adopts the IPv4, the third bit and fourth bit of the first byte of the Type field may be set as 1. Then, the value of the Type field may be 49.

After the default MDT is switched to the data MDT, the PE1, which may transmit the data MDT switch initiation packet, may need to periodically transmit the data MDT switch initiation packet, so that a PE device, which may join in the VPN A after the switching from the default MDT to the data MDT is finished, may join in the data MDT.

When a PE device, such as PE3 on longer connects with the receiver of the private network multicast data flow, the PE device may quit the data MDT.

Examples of the present disclosure also support the switching from the data MDT to the default MDT.

The PE1 may periodically check the each private network multicast group address, which may have been switched to the data MDT and makes a determination as to whether there may be private network multicast data flow satisfying the condition of switching from the data MDT to the default MDT. If there is private network multicast data flow satisfying the condition of switching from the data MDT to the default MDT, the data group address corresponding to the private network multicast group address of the private network multicast data flow may be stopped to be used and the private network multicast data flow corresponding to the private network multicast group address may be encapsulated with the default group address corresponding to the private network multicast group address, so that the private network multicast data flow may be switched from the data MDT to the default MDT.

The condition of switching from the data MDT to the default MDT may be as follows:

1) The traffic forwarding rate of the private network multicast data flow corresponding to the private network multicast group address may be kept less than a threshold in a third time period.

The threshold may be the same as that at block 305. The third time period may be larger than the first time period at block 305. For instance, the first time period may be 3 seconds and the third time period may be 60 seconds.

2) When the RP PE device finds that the scope of the data group corresponding to a VPN instance is changed and the other PEs, which may be preset to support the VPN instance are notified of the change of the scope of the data group, a PE device in the VPN instance finds that the currently-used data group address is no longer in the changed scope of the data group.

3) The PE device finds that the private network multicast group address of the PE device, which is preset to support the switching from the default MDT to the data MDT is changed and the private network multicast group address, which may have been switched to the data MDT, no longer support the switching from the default MDT to the data MDT.

In examples of the present disclosure, the PE1, which may be closest to the bidirectional PIM RP, may send the mapping relationship between the private network multicast group address, which may be preset to support the switching from the default MDT to the data MDT and the data group address to the other PE devices on the default MDT. After a PE device finds that the private network multicast data flow corresponding to the private network multicast group address satisfies the condition of switching from the default MDT to the data MDT, the process for switching from the default MDT to the data MDT may be initiated. Therefore, when the bidirectional PIM is used in the private network, the PE device may switch the private network multicast data flow from the default MDT to the data MDT. Therefore, the bidirectional PIM data flow may be forwarded in the public network not relying entirely on the default MDT, the network bandwidth may be saved and the burden of the PE device, which may not connect with a receiver, in the private network may be reduced.

Figure 4:
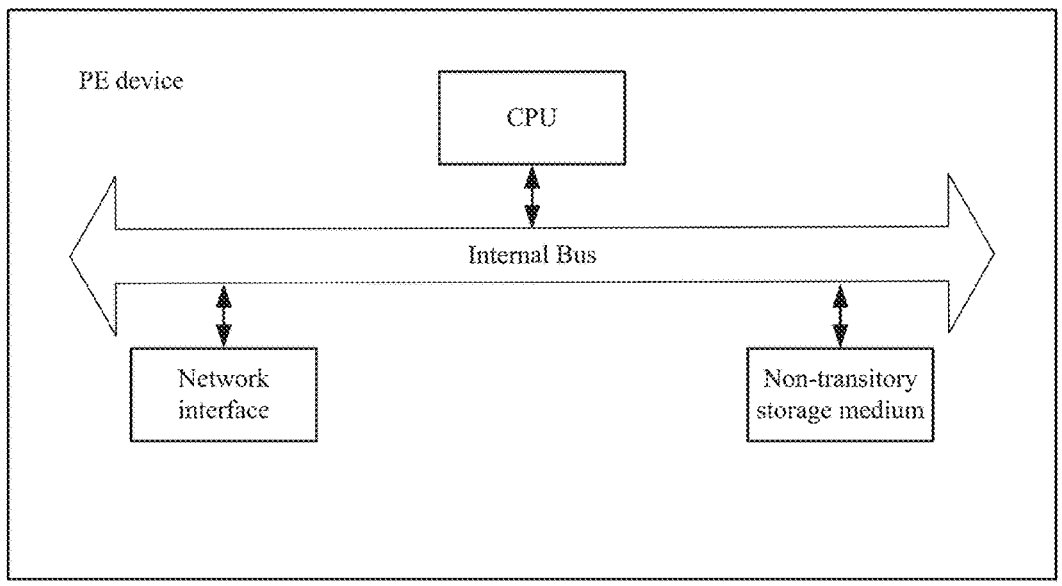
FIG. 4 is a diagram illustrating structure of a Provider Edge (PE) device in accordance with various examples of the present disclosure.

The PE device provided by examples of the present disclosure may be a programmable device consisting of hardware and machine-readable instructions. The hardware architecture of the PE device may be shown in FIG. 4. FIG. 4 is a diagram illustrating structure of a Provider Edge (PE) device in accordance with various examples of the present disclosure. The PE device may include: a non-transitory storage medium, a processor and other hardware. The processor may be a CPU and the other hardware may include a network interface and an internal bus.

The non-transitory storage medium may store machine readable instructions.

The CPU may communicate with the non-transitory storage medium to read and execute the machine readable instructions in the non-transitory storage medium, to store a mapping relationship between a private network multicast group address, which may be preset to support switching from a default MDT to a data MDT, and a data group address;

if private network multicast data flow corresponding to the mapping relationship satisfies a condition of switching from the default MDT to the data MDT, send a data MDT switch initiation packet including the private network multicast group address and the data group address to a second PE device on the default MDT, so that the second PE device may join in the data MDT, a root of which may be the PE device initiating the data MDT switch initiation packet, using the data group address; and switch the private network multicast data flow to the data MDT, so that the private network multicast data flow may be transmitted on the data MDT.

In an example of the present disclosure, if the PE device is a Rendezvous Port (RP) PE device, which is closest to a bidirectional Protocol Independent Multicast (PIM) RP of a private network, the processor may be further to execute the machine readable instructions in the non-transitory storage medium, to create the mapping relationship between the private network multicast group address and the data group address; and send the mapping relationship to all other PE devices on the default MDT, so that all the other PE devices on the default MDT may store the mapping relationship.

In an example of the present disclosure, the data group address may be a data group address, which may be least cited, in a group of data group addresses corresponding to an instance, to which the private network multicast group address may belong;

the processor may be further to execute the machine readable instructions in the non-transitory storage medium, to send the mapping relationship between the private network multicast group address and the data group address, which may be least cited, to all the other PE devices on the default MDT.

If the PE device is not an RP PE device, which is closest to a bidirectional PIM RP of a private network, the processor may be further to execute the machine readable instructions in the non-transitory storage medium, to receive the mapping relationship from the RP PE device.

In an example of the present disclosure, the processor may be further to execute the machine readable instructions in the non-transitory storage medium, to receive a first data MDT switch initiation packet from a third PE device, in which the first data MDT switch initiation packet may include a first private network multicast group address, which may be preset to support switching from a first default MDT to a first data MDT, and a first data group address corresponding to the first private network multicast group address;

check whether the PE device connects with a receiver, which receives private network multicast data flow corresponding to the first private network multicast group address;

if the PE device connects with the receiver, join in a first data group corresponding to the first data group address using the first data group address to create the first data MDT;

if the PE device does not connect with the receiver, store the first private network multicast group address and the first data group address and join in the first data group after the PE device connects with the receiver.

In an example of the present disclosure, the processor may be further to execute the machine readable instructions in the non-transitory storage medium, to when a condition of switching from the data MDT to the default MDT is satisfied, stop using the data group address;

encapsulate the private network multicast data flow using the private network multicast group address.

Figure 5:
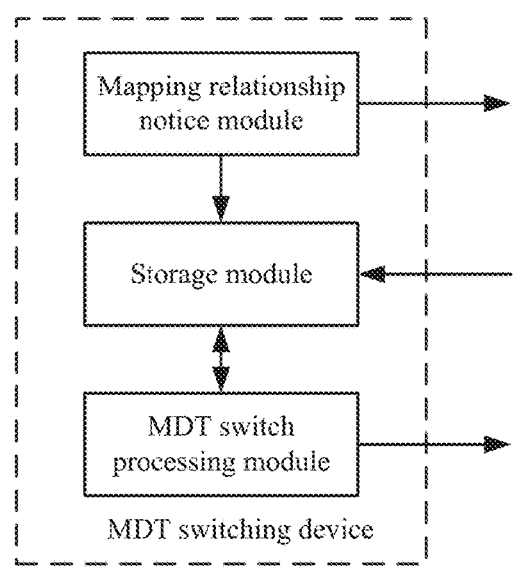
FIG. 5 is a diagram illustrating structure of an MDT switching device in accordance with various examples of the present disclosure.

FIG. 5 is a diagram illustrating structure of an MDT switching device in accordance with various examples of the present disclosure. As shown in FIG. 5, the MDT switching device in the PE device may include: a mapping relationship notice module, a storage module and an MDT switch processing module.

The mapping relationship notice module may be configured to map a private network multicast group address, which may be preset to support switching from a default MDT to a data MDT, into a data group address to obtain a mapping relationship if the PE device is an RP PE device, which is closest to a bidirectional PIM RP, store the mapping relationship in the storage module and send the mapping relationship to all other PEs on the default MDT used to forward private network multicast data flow corresponding to the private network multicast group address.

The storage module may be configured to store the mapping relationship between the private network multicast group address, which may be preset to support switching from the default MDT to the data MDT, and the data group address.

If private network multicast data flow corresponding to the mapping relationship stored in the storage module satisfies a condition of switching from the default MDT to the data MDT, the MDT switch processing module may be configured to send a data MDT switch initiation packet including the private network multicast group address and the data group address corresponding to the private network multicast group address to all other PE devices on the default MDT and encapsulate and transmit the private network multicast data flow using the data group address. If a PE device receiving the data MDT switch initiation packet connects with a receiver, which receives the private network multicast data flow, the PE device may join in the data MDT, the root of which may be the MDT switching device using the data group address. If the PE device receiving the data MDT switch initiation packet does not connect with the receiver, the PE device may cache the private network multicast group address and the data group address corresponding to the private network multicast group address. After the PE connects with the receiver, the PE may join in the MDT switching device, the root of which may be the MDT switching device using the data group address.

In an example of the present disclosure, the condition of switching from the default MDT to the data MDT may be that the flow forwarding rate of the private network multicast data flow may keep larger than a threshold in a first time period.

The mapping relationship notice module may send the mapping relationship to all the other PE devices on the default MDT. As for each local private network bidirectional PIM forwarding table, if a private network multicast group address in the private network bidirectional PIM forwarding table is a private network multicast group address, which may be preset to support switching from the default MDT to the data MDT, a data group address, which may be least cited, may be selected from a scope of the data group addresses corresponding to the mapping relationship, the mapping relationship notice module may send the mapping relationship between the private network multicast group address and the data group address, which may be least cited to all the other PE devices on the default MDT.

The MDT switch processing module may send a data MDT switch initiation packet to all the other PE devices on the default MDT. The MDT switch processing module may periodically send the data MDT switch initiation packet to all the other PE devices on the default MDT corresponding to the private network multicast group address. The data MDT switch initiation packet may include the private network multicast group address and the data group address corresponding to the private network multicast group address.

The MDT switch processing module may be further configured to receive a first data MDT switch initiation packet from another PE device, read a first private network multicast group address, which may be preset to support switching from a first default MDT to a first data MDT, and a data group address corresponding to the first private network multicast group address from the first data MDT switch initiation packet, check whether the MDT switching device connects with a receiver, which receives private network multicast data flow corresponding to the first private network multicast group address; if the MDT switching device connects with the receiver, join in the first data MDT, a root of which is the PE device initiating the first data MDT switch initiation packet; if the MDT switching device does not connect with the receiver, cache the first private network multicast group address and the first data group address corresponding to the private network multicast group address and join in the first data MDT using the first data group address after the MDT switching device connects with the receiver.

The MDT switch processing module may encapsulate and transmit the private network multicast data flow using the data group address. In a second time period after the data MDT switch initiation packet is sent out, the MDT switch processing module may stop using the default group address corresponding to the private network multicast group address, encapsulate the private network multicast data flow corresponding to the private network multicast group address using the data group address.

The mapping relationship notice module may send the mapping relationship to all the other PE devices on the default MDT. The mapping relationship notice module may add the mapping relationship between the private network multicast group address and the data group address to a TLV of a MDT join packet and send the TLV of the MDT join packet to all the other PE devices on the default MDT. A type field of the TLV of the MDT join packet may include a bidirectional PIM-specific data MDT switch notice packet identifier. The MDT switch processing module may send the data MDT switch initiation packet to all the other PE devices on the default MDT. The MDT switch processing module may add the data group address corresponding to the private network multicast group address to the TLV of the MDT join packet and send the TLV of the MDT join packet to all the other PE devices on the default MDT corresponding to the private network multicast group address. The type field of the TLV of the MDT join packet may include a bidirectional PIM-specific data MDT switch initiation packet identifier.

The MDT switch processing module may be further to, when the private network multicast group address satisfies a condition of switch from the data MDT to the default MDT, stop using the data group address corresponding to the private network multicast group address and encapsulate the private network multicast data flow corresponding to the private network multicast group address using a default group address corresponding to the private network multicast group address.

The condition of switching from the data MDT to the default MDT may be as follows.

1) The traffic forwarding rate of the private network multicast data flow corresponding to the private network multicast group address may be kept less than a threshold in a third time period.

2) The scope of the data group may be changed and the data group address may be no longer in the changed scope of the data group.

3) The private network multicast group address, which may be preset to support the switching from the default MDT to the data MDT may be changed and the private network multicast group address, which may have been switched to the data MDT, may no longer support the switching from the default MDT to the data MDT.

The MDT switching device may be a logic device. Machine readable instructions stored on a non-transitory machine readable storage medium may be executed by a processor to perform corresponding operations according to the MDT switching method in the above examples.

What is claimed is:

1. A method, comprising:
receiving, by a first Provider Edge (PE) device from a second PE device, a Multicast Distribution Tree (MDT) switch notice packet comprising a mapping relationship between a private network multicast group address, which is preset to support switching from a default MDT bidirectional [*, G] tree to a data MDT [*, G] tree, and a data group address, the data group address included in the MDT switch notice packet by the second PE device based on a search of a bidirectional Protocol Independent Multicast (PIM) forwarding table by the second PE device;
storing, by the first PE device, the mapping relationship;
in response to a private network multicast data flow corresponding to the mapping relationship satisfying a condition of switching from the default MDT bidirectional [*, G]-tree to the data MDT [*, G] tree, sending, by the first PE device, a data MDT switch initiation packet including the private network multicast group address and the data group address to a third PE device on the default MDT bidirectional [*, G] tree, to cause joining by the third PE device of the data MDT [*, G] tree, a root of which is the first PE device, using the data group address; and
switching, by the first PE device, the private network multicast data flow to the data MDT [*, G] tree, so that the private network multicast data flow is transmitted on the data MDT [*, G]-tree.

2. The method according to claim 1, wherein the second PE device is a Rendezvous Port (RP) PE device, which is closest to a bidirectional PIM RP of a private network,
wherein the mapping relationship between the private network multicast group address and the data group address is created by the second PE device, and
wherein the mapping relationship is sent by the second PE device to a plurality of PE devices on the default MDT bidirectional [*, G] tree using type-length-value fields of a MDT join packet, to cause the plurality of PE devices on the default MDT bidirectional [*, G] tree to store the mapping relationship, the MDT switch notice packet comprising the MDT join packet.

3. The method according to claim 2, wherein the data group address is least cited in a group of data group addresses corresponding to an instance to which the private network multicast group address belongs.

4. The method according to claim 1, further comprising:
receiving, by the first PE device, a first data MDT switch initiation packet from another PE device, the first data MDT switch initiation packet including a first private network multicast group address, which is preset to support switching from a first default MDT bidirectional [*, G] tree to a first data MDT [*, G] tree, and a first data group address corresponding to the first private network multicast group address;
checking, by the first PE device, whether the first PE device connects with a receiver that receives a private network multicast data flow corresponding to the first private network multicast group address;
if the first PE device connects with the receiver, joining in, by the first PE device, a first data group corresponding to the first data group address to create the first data MDT [*, G] tree;
if the first PE device does not connect with the receiver, storing, by the first PE device, the first private network multicast group address and the first data group address and joining in, by the first PE device, the first data group after the first PE device connects with the receiver.

5. The method according to claim 1, further comprising:
in response to a condition of switching from the data MDT [*, G] tree to the default MDT bidirectional [*, G] tree being satisfied, stopping, by the first PE device, using the data group address; and
encapsulating, by the first PE device, the private network multicast data flow using the private network multicast group address.

6. The method according to claim 1, further comprising:
for a virtual private network (VPN), searching, by the second PE device, the bidirectional PIM forwarding table to find an entry in the bidirectional PIM forwarding table for the VPN; and
in response to determining that the entry in the bidirectional PIM forwarding table comprises the private network multicast group address that supports switching from the default MDT bidirectional [*, G] tree to the data MDT [*, G] tree, select the data group address from a plurality of data group addresses to include in the MDT switch notice packet.

7. The method according to claim 6, wherein the MDT switch notice packet comprises an identifier specifying that the MDT switch notice packet is a bidirectional PIM-specific data MDT switch notice packet.

8. The method according to claim 6, further comprising: sending, by the second PE device, the MDT switch notice packet to a plurality of PE devices.

9. A first Provider Edge (PE) device, comprising:
a non-transitory storage medium and a processor, wherein the processor is to execute machine readable instructions stored in the non-transitory storage medium to:
receive, from a second PE device, a Multicast Distribution Tree (MDT) switch notice packet comprising a mapping relationship between a private network multicast group address, which is preset to support switching from a default multicast distribution tree (MDT) bidirectional [*, G] tree to a data MDT [*, G] tree, and a data group address the data group address included in the MDT switch notice packet by the second PE device based on a search of a bidirectional Protocol Independent Multicast (PIM) forwarding table by the second PE device;
store the mapping relationship;
in response to a private network multicast data flow corresponding to the mapping relationship satisfying a condition of switching from the default MDT bidirectional [*, G] tree to the data MDT [*, G] tree, send a data MDT switch initiation packet including the private network multicast group address and the data group address to a third PE device on the default MDT bidirectional [*, G] tree, to cause joining by the third PE device of the data MDT [*, G] tree, a root of which is the first PE device, using the data group address; and
switch the private network multicast data flow to the data MDT [*, G] tree, so that the private network multicast data flow is transmitted on the data MDT [*, G] tree.

10. The first PE device according to claim 9, wherein the processor is further to execute the machine readable instructions in the non-transitory storage medium, to:
receive a first data MDT switch initiation packet from a another PE device, the first data MDT switch initiation packet including a first private network multicast group address, which is preset to support switching from a first default MDT bidirectional [*, G] tree to a first data MDT [*, G] tree, and a first data group address corresponding to the first private network multicast group address;
check whether the PE device connects with a receiver that receives a private network multicast data flow corresponding to the first private network multicast group address;
if the PE device connects with the receiver, join in a first data group corresponding to the first data group address using the first data group address to create the first data MDT [*, G] tree;
if the PE device does not connect with the receiver, store the first private network multicast group address and the first data group address and join in the first data group after the PE device connects with the receiver.

11. The first PE device according to claim 9, wherein the processor is further to execute the machine readable instructions in the non-transitory storage medium, to:

in response to a condition of switching from the data MDT [*, G] tree to the default MDT bidirectional [*, G] tree being satisfied, stop using the data group address;
encapsulate the private network multicast data flow using the private network multicast group address.

12. The first PE device according to claim 9, wherein the MDT switch notice packet comprises an identifier specifying that the MDT switch notice packet is a bidirectional PIM-specific data MDT switch notice packet.

13. A non-transitory machine-readable storage medium comprising instructions that upon execution cause a first Provider Edge (PE) device to:
create a mapping relationship between a private network multicast group address that supports switching from a default MDT bidirectional [*, G] tree to a data MDT [*, G] tree and a data group address;
send a Multicast Distribution Tree (MDT) switch notice packet comprising the mapping relationship from the first PE device on the default MDT bidirectional [*, G] tree to a plurality of PE devices on the default MDT bidirectional [*, G] tree;
include the data group address in the MDT switch notice packet based on a search of a bidirectional Protocol Independent Multicast (PIM) forwarding table by the first PE device; and
switch a private network multicast data flow from the default MDT bidirectional [*, G] tree to the data MDT [*, G] tree, so that the private network multicast data flow is transmitted on the data MDT [*, G] tree upon the private network multicast data flow satisfying a switching condition, the switching being performed by the first PE device by sending a data MDT switch initiation packet including the private network multicast group address and the data group address to a second PE device on the default MDT bidirectional [*, G] tree.

14. The non-transitory machine-readable storage medium according to claim 13, wherein the instructions upon execution cause the first PE device to:
join the second PE device on the default MDT bidirectional [*, G] tree to the data MDT [*, G] tree, a root of which is the first PE device, using the data group address upon satisfying the switching condition and prior to the switching.

15. The non-transitory machine-readable storage medium according to claim 14, wherein the data MDT [*, G] tree is a subset of the default MDT bidirectional [*, G] tree.

16. The non-transitory machine-readable storage medium according to claim 13, wherein the MDT switch notice packet comprises a MDT join packet that includes type-length-value fields comprising a bidirectional PIM-specific data MDT switch notice packet identifier.

17. The non-transitory machine-readable storage medium according to claim 13, wherein the instructions upon execution cause the first PE device to:
stop use of the data group address in response to a switching condition of switching from the data MDT [*, G] tree to the default MDT bidirectional [*, G] tree being satisfied; and
encapsulate the private network multicast data flow using the private network multicast group address.

18. The non-transitory machine-readable storage medium according to claim 13, wherein the switching condition is that a flow forwarding rate of the private network multicast data flow exceeds a threshold in a first time period.

19. The non-transitory machine-readable storage medium according to claim 13, wherein the instructions upon execution cause the first PE device to:
- receive a first data MDT switch initiation packet from another PE device, the first data MDT switch initiation packet including a first private network multicast group address, which is preset to support switching from a first default MDT bidirectional [*, G] tree to a first data MDT [*, G] tree, and a first data group address corresponding to the first private network multicast group address;
- check whether the first PE device connects with a receiver that receives a private network multicast data flow corresponding to the first private network multicast group address;
- if the first PE device connects with the receiver, join in, by the first PE device, a first data group corresponding to the first data group address to create the first data MDT [*, G] tree;
- if the first PE device does not connect with the receiver, store, by the first PE device, the first private network multicast group address and the first data group address and joining in, by the first PE device, the first data group after the first PE device connects with the receiver.

20. The non-transitory machine-readable storage medium of claim 13, wherein the instructions upon execution cause the first PE device to:
- for a virtual private network (VPN), search the bidirectional PIM forwarding table to find an entry in the bidirectional PIM forwarding table for the VPN; and
- in response to determining that the entry in the bidirectional PIM forwarding table comprises the private network multicast group address that supports switching from the default MDT bidirectional [*, G] tree to the data MDT [*, G] tree, select the data group address from a plurality of data group addresses to include in the MDT switch notice packet.

* * * * *